March 6, 1934. M. G. BARRIER 1,949,672
CONTROL DEVICE FOR OIL OR GAS WELLS AND PIPE LINES
Filed March 24, 1933 5 Sheets-Sheet 1

Inventor
M. G. Barrier
By Clarence A. O'Brien
Attorney

March 6, 1934.    M. G. BARRIER    1,949,672
CONTROL DEVICE FOR OIL OR GAS WELLS AND PIPE LINES
Filed March 24, 1933    5 Sheets-Sheet 4

Inventor
M. G. Barrier
By Clarence A. O'Brien
Attorney

March 6, 1934.  M. G. BARRIER  1,949,672
CONTROL DEVICE FOR OIL OR GAS WELLS AND PIPE LINES
Filed March 24, 1933  5 Sheets-Sheet 5
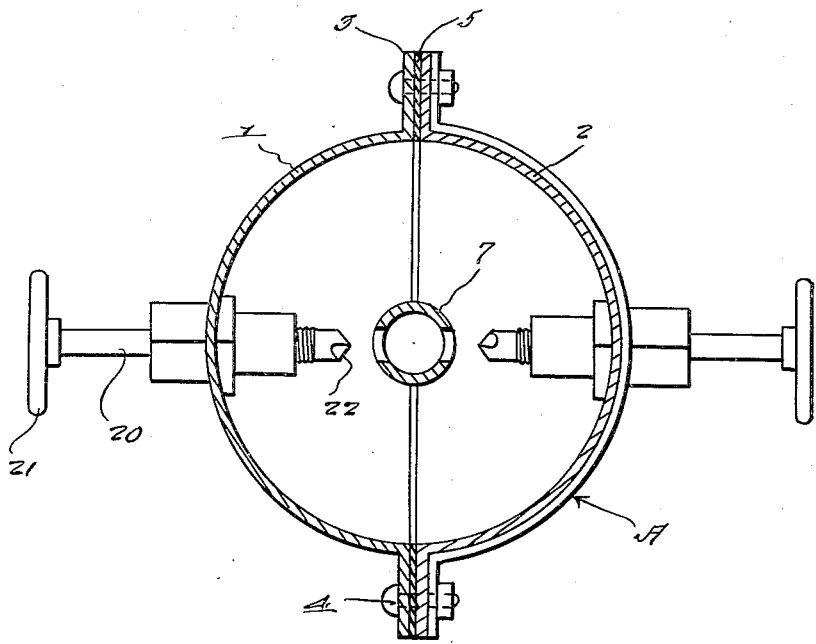
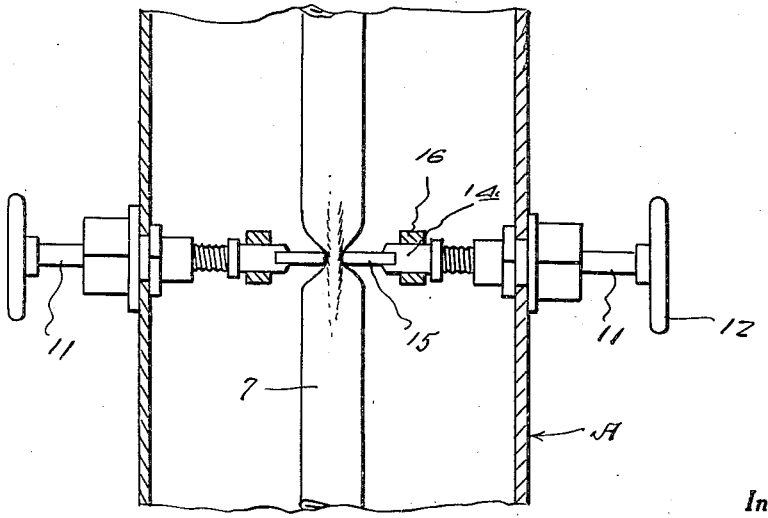
Inventor
M. G. Barrier
By Clarence A. O'Brien
Attorney Patented Mar. 6, 1934

1,949,672

UNITED STATES PATENT OFFICE 1,949,672

CONTROL DEVICE FOR OIL OR GAS WELLS
AND PIPE LINES

Mike Grayham Barrier, Tampa, Fla.

Application March 24, 1933, Serial No. 662,624

2 Claims. (Cl. 166—15)

This invention relates to a control device for oil and gas wells and for pipe lines, the general object of the invention being to provide means for extinguishing fires in oil and gas wells, for capping such wells and gas or water lines and for stopping leaks in pipe lines without cutting off water, gas or oil.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 5 is a section on line 5—5 of Figure 1.

Figure 6 is a detail sectional view showing how a pipe is closed by a part of the device.

Figure 1:
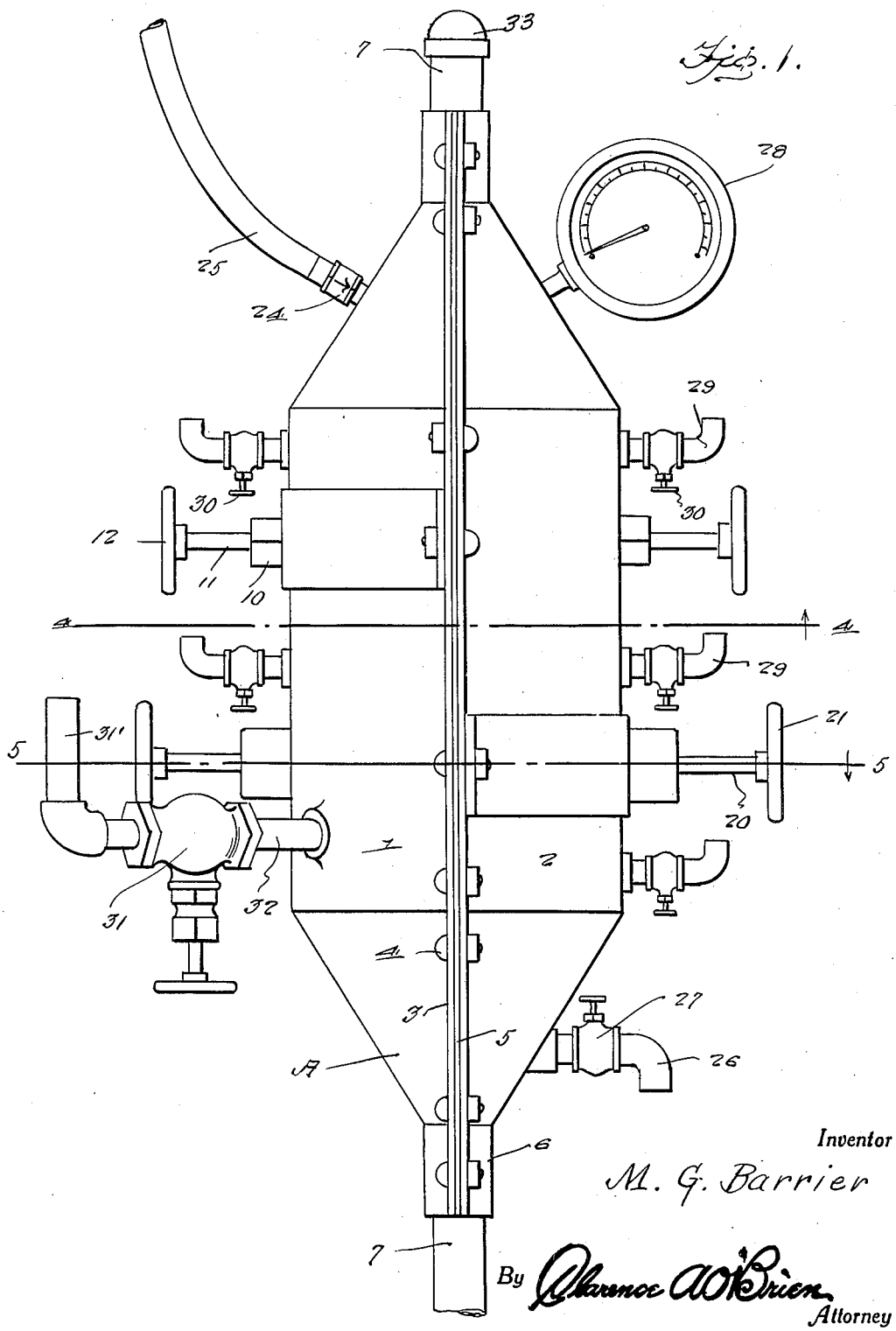
Figure 1 is an elevation of the device.
Figure 2:
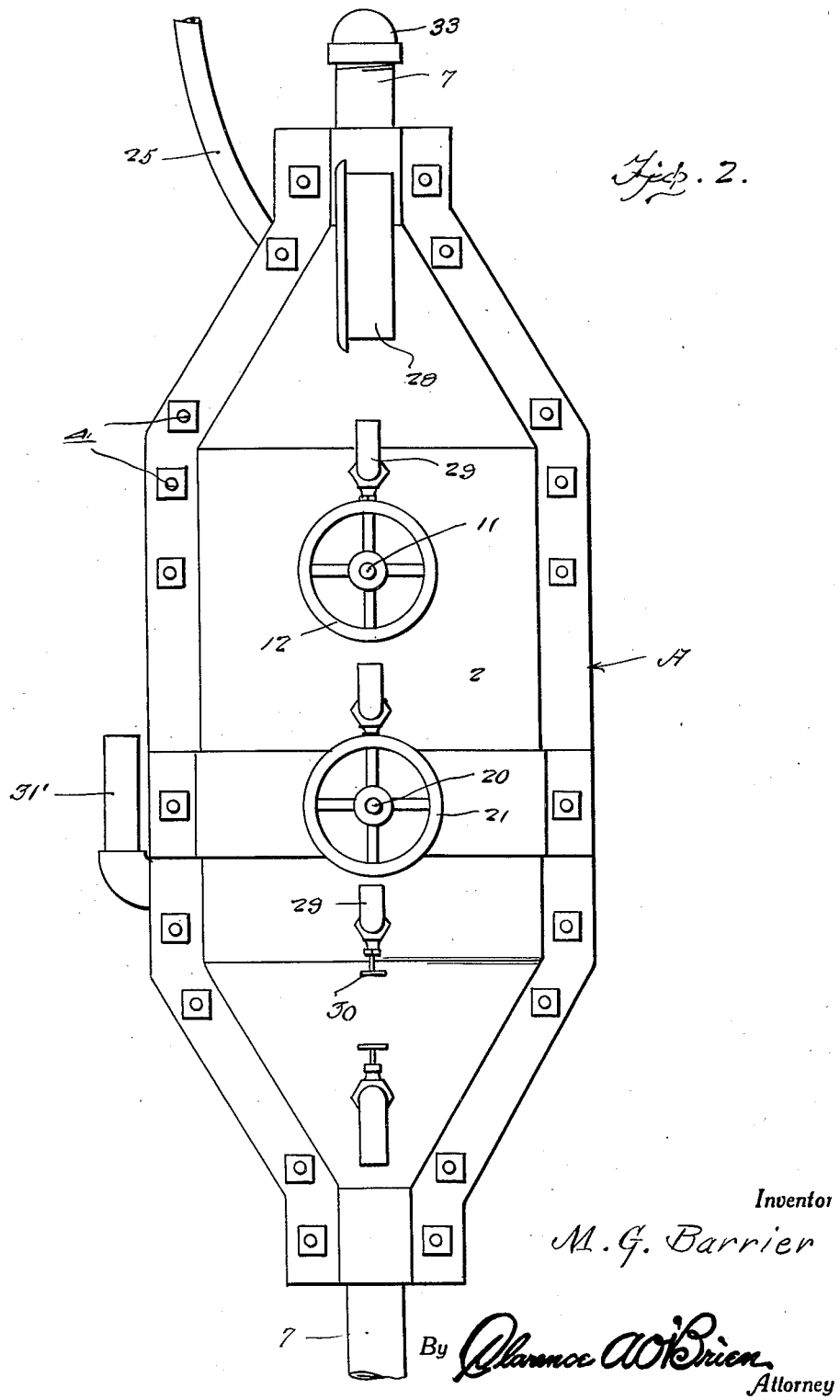
Figure 2 is a similar view but taken at right angles to Figure 1.

In these drawings, the letter A indicates a casing formed of a cylindrical part with conical ends, the casing being formed of two sections 1 and 2 provided with flanges 3 which are bolted together, as shown at 4, with a gasket 5 between the flanges. Each end of the casing is formed with a reduced cylindrical part 6 through which the pipe or well casing 7 passes.

In the cylindrical part of the casing, at diametrically opposite points, internally threaded bushings 8 pass through holes in the casing and these bushings are held in position by the lock nuts 9 and the packing caps 10 which are located exteriorly of the casing. A screw shaft 11 passes through each bushing and has a hand wheel 12 at its outer end. The inner end of each shaft is formed with a spherical part 13 which fits in a socket in a member 14 which carries a plate-like part 15. Thus the members 14 and 15 are rotatably arranged on the inner end of the shaft 11 and are held against rotary movement by the guide bars 16 arranged in the casing, so that these members 14 and 15 can be moved toward and away from the pipe 7, on which the device is placed, by turning the shaft 11 so that the two parts 15 when moved inwardly will compress a portion of the pipe 7, as shown in Figure 6, so as to close the pipe.

Figure 3:
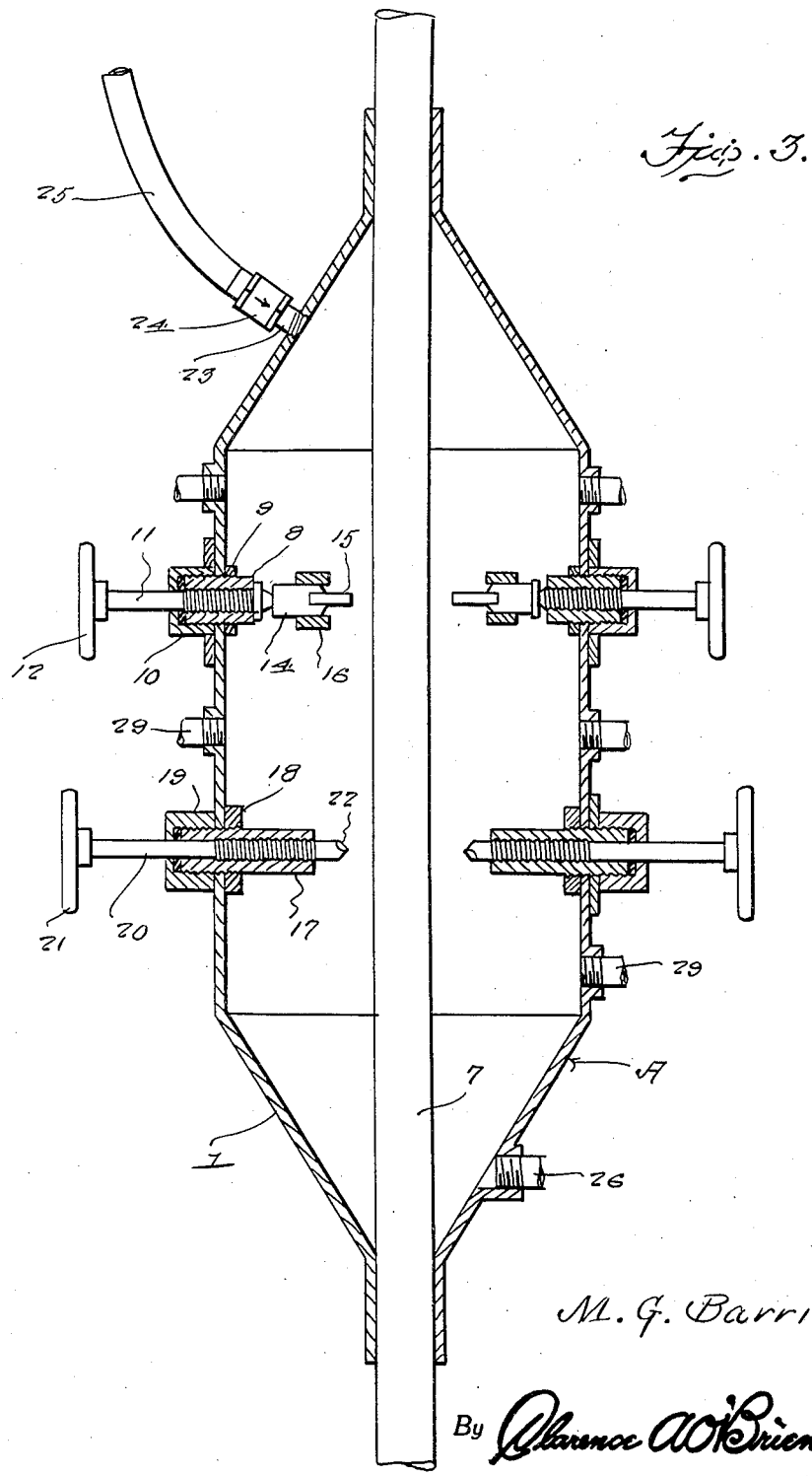
Figure 3 is a longitudinal sectional view through the device.
Figure 4:
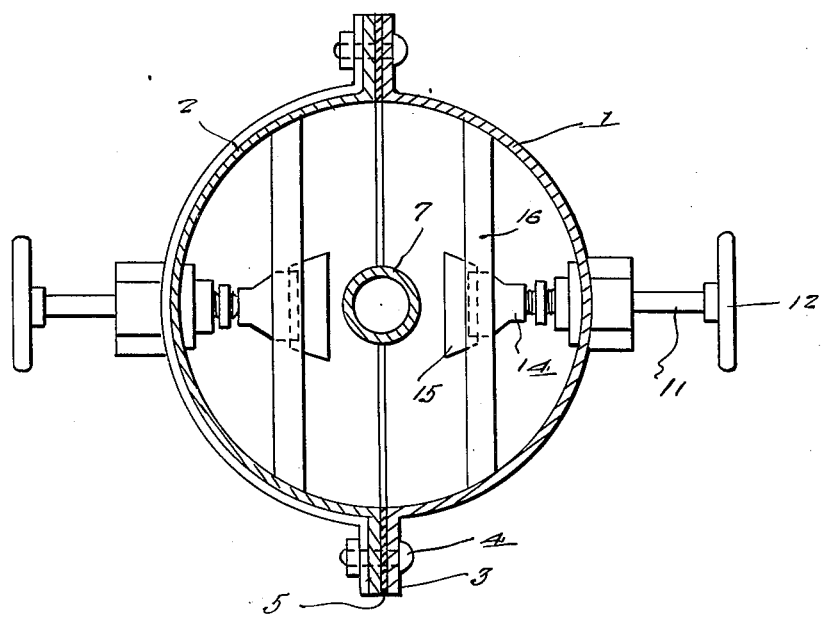
Figure 4 is a section on line 4—4 of Figure 1.
Figure 7:
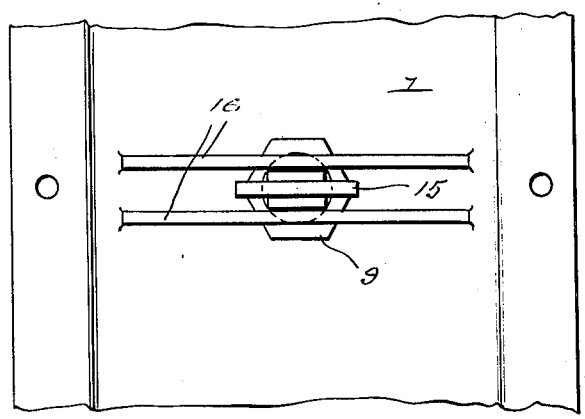
Figure 7 is a fragmentary view looking into a section of the casing and showing one of the pressing members.
Figure 8:
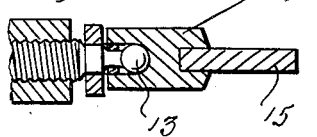
Figure 8 is a sectional detail view through one of such members.

A second pair of bushings 17 pass through oppositely arranged holes in the cylindrical part of the casing, as shown in Figure 3, and are held in place by the lock nuts 18 and the caps 19. A screw shaft 20 passes through each of the bushings 17 and is provided with a hand wheel 21 at its outer end and its inner end is formed with a bit 22 so that by turning these shafts 20 inwardly, they will bore a pair of oppositely arranged holes in the pipe 7, as shown in Figure 5. Then by backing the shaft, water or other fluid will pass from the pipe into the casing and fluid in the casing will pass into the pipe through these holes. A nipple 23 is screwed into the top part of the casing and a check valve 24 is fastened to the nipple and a hose 25 is connected to the valve so that fluid can be introduced into the casing. A drain pipe 26 is connected with the bottom part of the casing and contains a valve 27 so that the casing can be drained whenever necessary. A gauge 28 is fastened to the top of the casing and a plurality of pipes 29 is connected with the cylindrical part of the casing and each contains a valve 30. A valve 31 is also connected to the lower part of the cylindrical portion of the casing by a pipe 32. These valves, when opened, will permit pressure to escape from the casing after the holes are bored in the pipe 7 and by opening one valve at a time, one can ascertain just how much pressure there is in each valve line by watching the pressure gauge 28 and by closing all of the valves, the pressure gauge will show how much pressure there is in the well or pipe line. By opening the valve 27, any sediment or the like in the casing will be drained therefrom.

In using the device to extinguish a burning well, a tunnel would be dug to reach a part of the well casing a sufficient distance below the ground to avoid heat from the fire. The casing is then attached to the exposed part of the well casing and the same filled with water or chemicals through the hose 25. This water or chemicals will prevent any sparks occurring while the drills are being used to bore holes in the pipe or casing 7. In some cases, the water or chemicals introduced into the casing by the hose 25, entering the holes in the pipe 7, will extinguish the fire, but if the pressure from the introduction of the fluid into the casing through the hose 25 is not great enough to extinguish the fire, then the pressers are used to press the pipe, as shown in Figure 6, to close the same so that the oil or gases are shut off at the top of the well and thus the fire is extinguished. Then by attaching a pipe or hose to the valve 31 or one of the other pipes 29, the fluid entering the casing from the pipe 7 through the holes bored therein can be conveyed to any desired point. In case the well should catch fire a second time, all that is necessary is to close the globe valve to which the conveying pipe is connected.

This device can also be used to cap an oil or gas well as soon as the well is brought in by attaching the machine to the well casing before the well is brought in. When the well is brought in, the pressers are first used and when the flow is cut off, the drills are used so that the oil or gas will flow into the casing. Then the valve attached to the flow line can be opened so that the flow will pass to the desired point.

This invention will cap any oil, gas or water line without cutting off the water, gas or oil pressure. By clamping the device on the pipe and by using only one drill and the globe valve, the flow can be conveyed to the desired point.

The device can be also used to stop leaks in any water, oil or gas line by clamping the device over the leak so that the leakage will be caught by the device.

The valve 31 may have a pipe 31' attached thereto and a cap 33 may be placed on the upper end of the pipe 7 after the well has been cut off by the pressers if there is any leakage past the pressers.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a casing, a pair of oppositely arranged threaded shafts carried thereby, presser members at the inner ends of the shafts and rotatably supported thereby for pressing and closing a portion of a pipe passing through the casing, a shaft passing through the casing and having a bit at the inner end for boring a hole in the pipe, means for rotating the shafts, means for introducing fluid into the casing and valve carrying pipes connected to the casing.

2. A device of the class described comprising a casing, a pair of oppositely arranged threaded shafts carried thereby, presser members at the inner ends of the shafts and rotatably supported thereby for pressing and closing a portion of a pipe passing through the casing, a second pair of oppositely arranged threaded shafts passing through the casing and having bits at the inner ends for boring holes in the pipe, means for rotating the shafts, means for introducing fluid into the casing, valve carrying pipes connected to the casing, a pressure gauge attached to the casing and a drain valve connected to the bottom part thereof.

MIKE GRAYHAM BARRIER.